Figure 1:
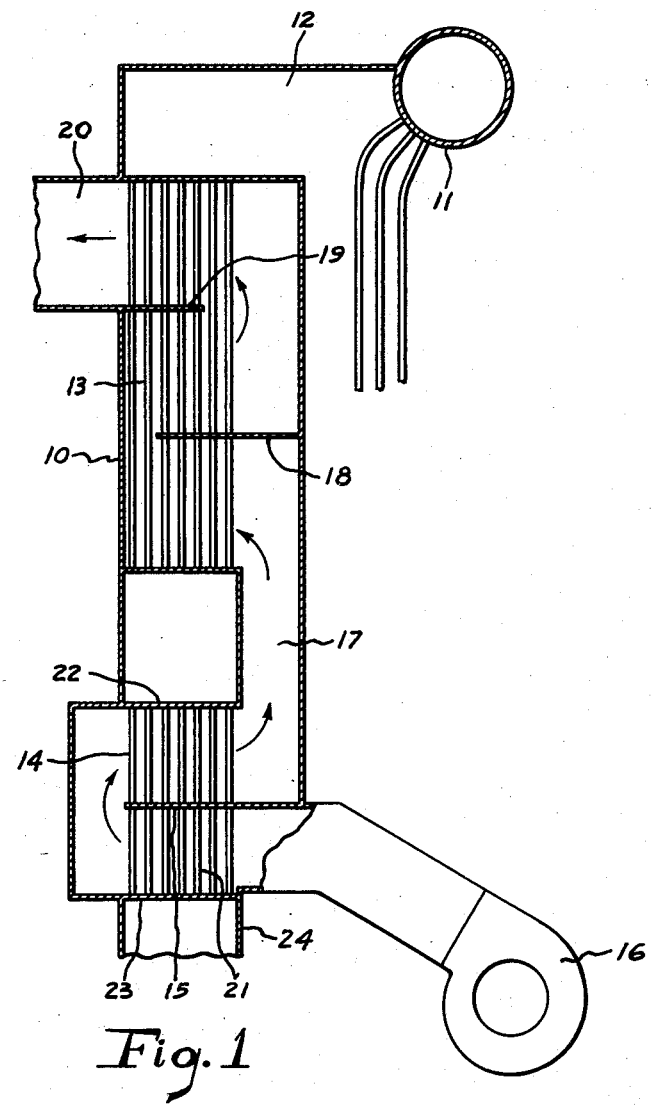

June 10, 1958  M. H. KUHNER  2,838,287
AIR HEATER
Filed Nov. 4, 1953  2 Sheets-Sheet 1

INVENTOR
MAX H. KUHNER

BY Norman S. Blodgett
ATTORNEY

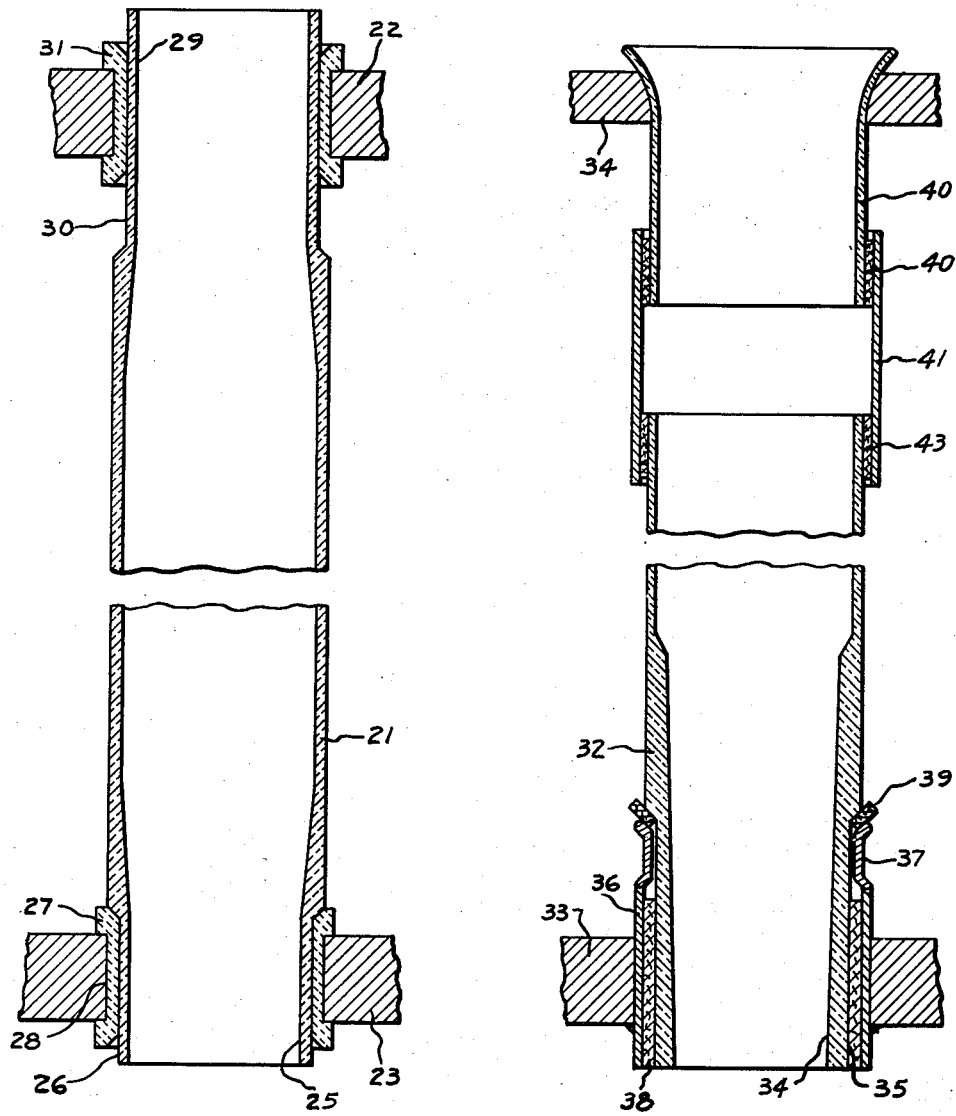

United States Patent Office 2,838,287
Patented June 10, 1958

2,838,287

AIR HEATER

Max H. Kuhner, Worcester, Mass., assignor to Riley Stoker Corporation, Worcester, Mass., a corporation of Massachusetts Application November 4, 1953, Serial No. 390,165

1 Claim. (Cl. 257—224)

This invention relates to air heaters and more particularly to apparatus arranged to heat incoming combustion air for a steam generating unit by thermal exchange with the outgoing gases of combustion.

It is common practice to heat the incoming air of a furnace by means of the waste gases of combustion. Usually the hot waste gases are passed through tubes and the air passes thereover. The most efficient units provide for the air to pass longitudinally of the gas tubes and counter to gas flow. This means that the coldest air is participating in thermal exchange with the coldest gas. Also the warmest air is heated by the hottest gas. Since this is the logical manner of bringing about the desired heat exchange, the method is widely accepted despite the difficulties attendant therewith. The most serious of these problems is that of corrosion. Now, the hot waste gases contain many corrosive substances that condense at relatively high temperatures, particularly if the fuel has a high sulphur content. It can be seen then that when the cold incoming air strikes the tubes at the end where the gas temperature is lowest the dew point of the corrosive volatiles may be reached. The condensation of such corrosive substances on the inside walls of the tubes is very destructive of the tubes, naturally, and is a matter of considerable concern to the workers in the art. The applicant by the present invention has obviated the above difficulties as will be apparent by the description to follow.

A natural outgrowth of the development of a non-corrosive air heater is the design of steam generating units to operate at efficiencies much higher than heretofore obtained. If it is possible to condense flue gas moisture by heating air, it will be possible not only to recover the heat of the dry gas but also the much greater quantity of the latent heat of evaporation of flue gas moisture. Steam generating units at present installed can be designed for efficiencies as high as 90%. The limit of this design efficiency is the final exit gas temperature which must normally be kept above 270° F. to prevent excessive condensation of flue gas moisture and thus prevent corrosion of the final heat exchange apparatus and of fans and duct work following the heat exchanger. With these designs 10% of the heat contained in the fuel being burned is lost. This consists of approximately 4.5% of heat discharged through the stack with dry flue gas and approximately 4% of the heat discharged through the stack with moisture contained in the flue gas; the remaining heat is lost by radiation and unburned combustibles. If it is possible by the use of a non-corrosive material in the final stages of the heat exchanger to cool the flue gas to nearly atmospheric temperature all of the heat in the dry flue gas and all of the heat in the flue gas moisture are recovered. For practical reasons it is of course not possible to reduce the flue gas temperature to atmospheric temperature simply by means of an air heater type heat exchanger, but it is possible to reduce the flue gas temperature to within 70 or 80° of ambient temperature. In doing so the dry flue gas loss will be reduced from approximately 4½% down to approximately 2% and the loss due to moisture in flue gas will be reduced from approximately 4% to approximately 0.5%. The gain in other words will be nearly 6 integer points in the efficiency so that the boiler unit can be operated at approximately 96% overall efficiency. This is accomplished only by recovering the heat of evaporation of the flue gas moisture. This means that the flue gas moisture must be completely condensed and its heat given off to combustion air.

It is therefore an outstanding object of the present invention to provide an air heater that is not adversely affected by the action of corrosive substances on the tubes.

A further object of this invention is the provision of an air heater tube which does not deteriorate in use.

A still further object of the present invention is the provision of an air heater construction permitting the use of glass tubes without the dangers of breakage of the tubes due to thermal expansion and contraction of the metallic portions of the air heater.

It is another object of the instant invention to provide a joint construction for use in an air heater having, as a portion thereof, frangible tubes of a thermal coefficient of expansion which differs considerably from the remaining portions of the heater.

Although the novel features which are believed to be characteristic of this invention will be particularly pointed out in the claim appended hereto, the invention itself as to its objects and advantages, the mode of its operation, and the manner of its organization, may be better understood by referring to the following description taken in connection with the accompanying drawings forming a part thereof in which:

Figure 1 is a vertical sectional view of an air heater constructed after the teachings of the present invention, Figure 2 is a vertical sectional view of a joint constructed according to the present invention, and Figure 3 is a vertical sectional view of a modification of the invention.

Like reference characters denote similar parts in the several figures of the drawings.

In accordance with the invention a tubular air heater of more or less standard design will consist of a large high temperature end and a separate short section in which the flue gases of low temperature pass through the tubes and air of ambient temperature passes over the outside of the tubes more or less in counterflow. The flue gas temperature at which condensation takes place varies with the sulphur content of the fuel being burned. The higher the sulphur content, the higher the temperature of condensation which is commonly called the dew point. A glass tube section of the air heater will then be used for that portion of the heat recovery unit in which condensation can be expected. The glass tubes will be held in top and bottom tube sheets in such a way that the steel structure can expand independently of the glass tubes so that a shifting of the upper tube sheet in reference to the lower one will not break the tubes. The glass tubes are hung from the top tube sheet and may be supported thereon through a flexible packing, preferably of glass fabric tape impregnated with silicon. The lower ends of the glass tubes will slide in the tube holes of the lower tube sheet, but they are again insulated from the steel tube sheet by a band of glass fabric tape.

Referring first to Figure 1, wherein is best shown the general aspects of the invention, the air heater 10 is shown in use in conjunction with a boiler 11 from which the hot gases of combustion leave by means of a duct 12. The air heater consists of a high temperature section 13 and a low temperature section 14. The low temperature section is mounted beneath the high temperature section and the duct 12 is connected to the upper portion of the high temperature section 13. A baffle 15 extends horizontally across the central portion of the low temperature section 14 thus dividing that section into two passes. An air fan 16 is connected to the lowermost pass of the low temperature section. A blank pass 17 connects the upper pass of the low temperature section 14 to the high temperature section 13. Horizontal baffles 18 and 19 extend across the high temperature section and divide it into three passes, the uppermost pass being connected to a duct 20 which leads to the burners of the furnace associated with the steam generating unit.

The low temperature section 14 comprises the glass tubes 21 which extend from an upper tube sheet 22 to a lower tube sheet 23. The tubes in both sections of the air heater are open at the ends so that gas originating in the boiler 11 may pass through the inside of the tubes to a flue gas breeching 24 which is connected to induced draft fans not shown.

Figure 2 shows the details of construction involved in the connection between a tube 21 and the lower tube sheet 23 of the low temperature section of the air heater as well as the details of the connection between the upper portion of the same tube with the upper tube sheet 22. At the lower end, the inside diameter of the tube is gradually and substantially reduced to a cylindrical portion 25. At the same time the outside diameter of the tube is abruptly and substantially reduced to a cylindrical portion 26. A bushing 27 formed of a silastic material such as glass fabric tape impregnated with silicon surrounds the reduced portion 26 and is itself provided with an annular recess 28 in which resides the tube sheet 23. At the upper end the tube inside diameter is reduced at portion 29 while the outside diameter is substantially and abruptly reduced at the portion 30. A bushing 31 similar to that used at the lower end of the tube surrounds the reduced portion 30 and embraces the tube sheet 22.

The operation of the apparatus will be evident from the above description. The gas originating in the furnace and the boiler 11 passes through the duct 12 and downwardly through the air heater 10. The gas passes through the inside of the tubes of the high temperature section 13 and then downwardly through the inside of the tubes 21 of the low temperature section 14 passing outwardly through the breeching 24. The air to be heated originates in the fan 16 and passes through the lower portion of the low temperature section and then through the upper portion of the low temperature section, passes upwardly through the blank pass 17 and successively through the horizontal passes of the high temperature section 13, eventually passing into the duct 20 and ultimately to the furnace of the steam generating unit. As the air heater passes through various temperature phases, particularly in starting and shutting down of the steam generating unit, the tube sheets 22 and 23 will be separated by varying vertical distances, while the tubes 21 will tend to expand to a considerably lesser degree. However, due to the novel construction of the joints between the tubes and the tube sheets, the bushings slide along the reduced cylindrical portions on which they are mounted. In other words the bushing 27 slides along the portion 26 of the tube 21 and remains with the tube sheet 23. In the same way the bushing 31 remains with the tube sheet 22 and slides along the portion 30 of the tube 21. Thus the tube rests on the lower tube sheet 23 and most of the sliding takes place between the upper tube sheet 22 and the upper portion of the tube 21. The bushings 27 and 31 provide for a gas type non-corrosive seal between the tube and the tube sheets. It should be noted that the pressure of the tube shoulder on the bushing 27 will cause it to bulge into gas-tight relationship with the tube and the aperture. This sealing will take place effectively even after long operation and despite the compression of the bushing that would otherwise take place due to the expansion and contraction of the tube sheet.

In Figure 3 is shown a modification of the means by which the glass tube is mounted in the air heater. In this view a tube 32 is shown in use in conjunction with a lower tube sheet 33 and an upper tube sheet 34. At its lower end the tube 32 is provided with a substantially reduced inner diameter in the portion 34. Its outside diameter is also reduced in the portion 35, but this reduction is considerably less than in the portion 34. A steel ferrule is welded in the aperture in the tube sheet 33. The ferrule 36 is generally tubular for most of its length but is provided with an annular bead 37 at its upper extremity. The bead 37 is provided with a cylindrical inner surface slightly larger in diameter than the outer diameter of the portion 35 of the tube 32. Between the tubular lower portion of the ferrule 36 and the reduced portion 35 of the tube 32 are placed many layers of glass fabric tape 38. Between the uppermost portion of the ferrule 37 and the transition between the portion 35 and the normal intermediate portion of the tube 32 is placed an annular washer 39 formed of non-corrosive material. Into the aperture in the upper tube sheet 34 is beaded a short section of ordinary metallic air heater tubing 40. The lower end of this section 40 extends downwardly to within a few inches of the upper end of the tube 32 and over the two is placed a telescoping steel sleeve 41. Between the sleeve 41 and the section 40 is placed a filler of glass fabric tape and a similar filler 43 is inserted between the sleeve 41 and the upper end of the tube 32.

While certain novel features of the invention have been shown and described and are pointed out in the annexed claim, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

An air heater for a steam generating unit comprising a vertical glass tube through which gases from the unit pass, the glass being of a type having the ability to withstand, without breaking, substantial differences in temperature from one portion to another, said tube having a reduced portion at one end, a first horizontal metallic tube sheet having an aperture in which the reduced end of the tube is held, a second metallic tube sheet spaced from the first and having an aperture a gas-tight, temperature-resistant, non-corrosive, resilient bushing between the first sheet and the said one end of the tube, the said bushing being fixed relative to the tube sheet and normally contacting the surface of the reduced portion of the tube in sliding relationship, walls extending around the tube and sheets causing air to pass externally of the tube between tube sheets, a shoulder between the reduced portion and the remainder of the tube, the shoulder contacting the bushing for supporting a substantial portion of the weight of the tube, a means consisting of a bushing of heat-resistant material slidably connecting the other end of the tube to the aperture of the second sheet, the said shoulder contacting the bushing in the said first aperture to cause it to expand into gas-tight relationship with the said first aperture.

References Cited in the file of this patent

UNITED STATES PATENTS

| | | |
|---|---|---|
| 407,037 | Robertson | July 16, 1889 |
| 627,992 | Everson | July 4, 1899 |

FOREIGN PATENTS

| | | |
|---|---|---|
| 29,777 | Great Britain | Dec. 27, 1912 |
| 191,988 | Great Britain | Jan. 25, 1923 |
| 398,790 | Great Britain | Dec. 28, 1931 |
| 549,431 | Great Britain | Nov. 20, 1942 |
| 609,206 | Great Britain | Sept. 28, 1948 |
| 462,415 | Italy | Mar. 17, 1951 |